July 21, 1925.
C. W. LANDERS
1,546,664
MOTOR AND DYNAMO CONSTRUCTION
Filed March 5, 1924
2 Sheets-Sheet 1
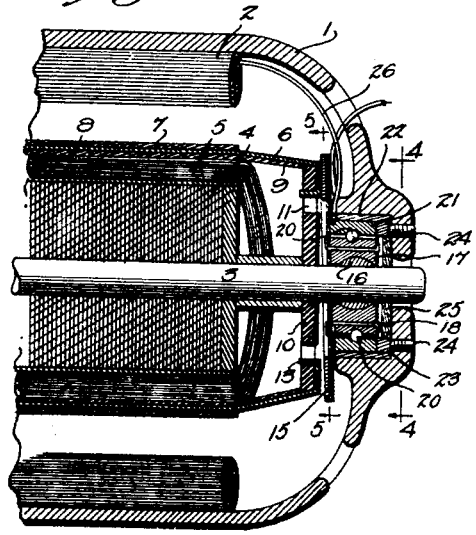
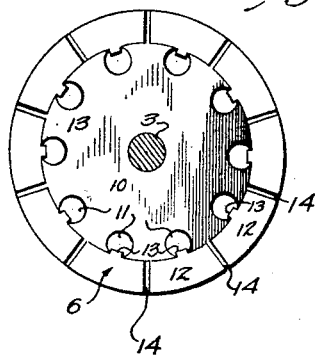
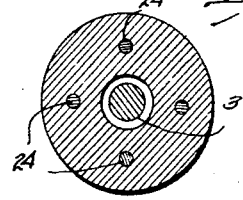
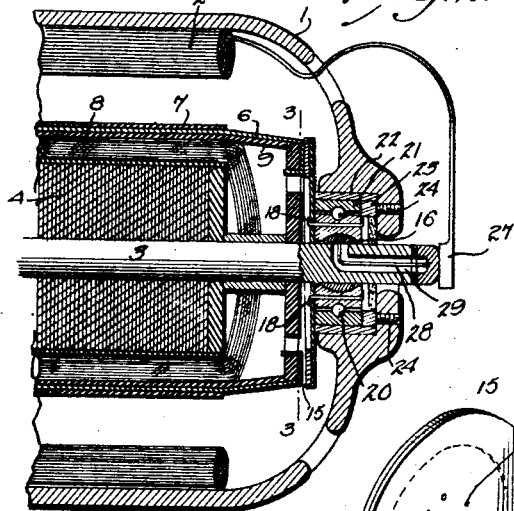
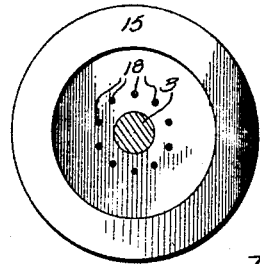
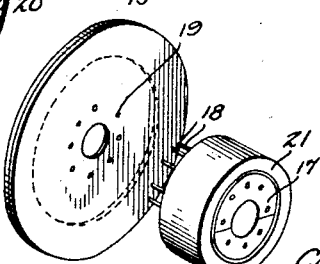
Inventor
Clyde W. Landers July 21, 1925.
C. W. LANDERS
1,546,664
MOTOR AND DYNAMO CONSTRUCTION
Filed March 5, 1924
2 Sheets-Sheet 2
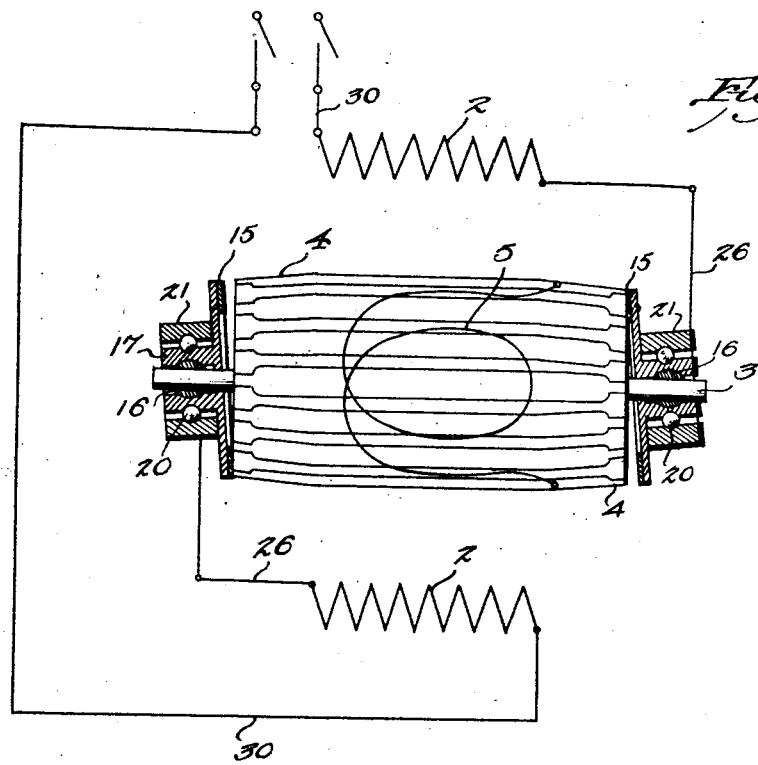
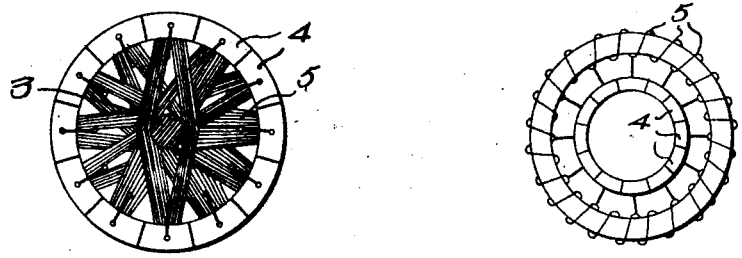
Inventor
Clyde W. Landers
By
Attorney Patented July 21, 1925.

1,546,664

UNITED STATES PATENT OFFICE.

CLYDE W. LANDERS, OF LOUISVILLE, KENTUCKY.

MOTOR AND DYNAMO CONSTRUCTION.

Application filed March 5, 1924. Serial No. 697,124.

*To all whom it may concern:*

Be it known that I, CLYDE W. LANDERS, a citizen of the United States, residing at Louisville, in the county of Jefferson and State of Kentucky, have invented certain new and useful Improvements in Motor and Dynamo Constructions, of which the following is a specification.

This invention relates to improvements in motor and dynamo construction, and more particularly to connecting means for the field and armature of a direct current motor.

Broadly, the invention comprises an improvement adapted to be employed in the place of the usual commutator construction whereby friction is eliminated, and the well known disadvantages incident to the use of the usual commutator construction are eliminated.

An object of the invention is to provide a member carried by the shaft and arranged at an angle adapted to make contact at one point at a time with a member carried by the armature.

More specifically, the invention comprises a metallic squirrel cage mounted in and carried by the armature, the bars of the cage extending outwardly and being bent over a ring of insulating material, forming a substantially continuous metallic ring. In connection with these rings, arranged at each end of the motor, I employ disks of copper, carbon, or other contacting material, which disks are mounted on ball bearings so arranged in the frame that the disk is at an angle, and contacts with the metallic ring at only one point. As the ring and disk revolve, the point of contact is continually changed, thus functioning in the same manner as the ordinary brush but eliminating the friction ordinarily present between the brush and the slip ring.

In the accompanying drawings, I have shown several embodiments of the invention.
In this showing:

Figure 1 is a sectional view of one end of a motor showing one form of the invention, Figure 2 is a similar view of a modified form,

Figure 3 is a vertical sectional view on line 3—3 of Figure 2,

Figure 4 is a similar view on line 4—4 of Figure 1,

Figure 5 is a similar view on line 5—5 of Figure 1,

Figure 6 is a perspective view of the contacting disk and bearing by which it is carried, Figure 7 is a diagrammatic view of a motor showing the connection between the field and the revolving member on the end of the shaft, Figure 8 is an end view of a drum type motor with the casing removed, and,

Figure 9 is a similar view of a gramme ring type motor.

Referring to the drawings, the reference numeral 1 designates the outer casing which is of the usual construction. A stationary field 2 is arranged within the casing. The motor or dynamo is provided with a shaft 3 and an armature is mounted to revolve therewith. As shown, the armature consists of a core 4 and windings 5. Suitable bars of copper 6 are arranged on the armature. As shown, fibre bars 7 are arranged on the outside of the copper bars and similar fibre bars 8 are arranged on the inside. The bars 7 terminate at the end of the armature core and the bars 8 are extended, as at 9, and connected to a disk 10 of insulating material arranged on the shaft. This disk is provided with a plurality of openings 11. The copper bars are extended over the periphery of the disk and downwardly on its outer face, as indicated at 12, (see Figure 3). The ends of the downwardly extended portions may be arranged in the openings 11, as shown at 13. As shown in Figure 3 of the drawings, the portions of the bars arranged on the face of the disk form a substantially continuous metallic ring having air gaps 14 therein. A disk 15 of conducting material is arranged on the shaft and adapted to revolve therewith, the disk being arranged at an angle whereby different points on the disk will contact with different points on the metallic ring as they revolve, the contact taking place at the same relative point in the casing at all times. As shown, the shaft is provided with a substantially spherical extension 16, formed of hard ground steel. A split bushing 17 of insulating material is arranged thereon and this bushing is provided with pins 18, which project through openings 19 in the copper disk. The periphery of the bushing is provided with a race-way adapted to receive ball bearings 20, and the other half of the bearing cage is arranged over the ball bearings, as shown at 21. The bearing is insulated from the frame by means of a ring 22. An adjusting ring 23 is arranged outwardly of the bearing and this ring is adapted to be adjusted by means of screw 24, carried by the frame. A felt washer 25 is arranged adjacent the bearing.

As shown in Figure 7 of the drawings, the field windings 2 are connected to the bearing cages by means of lead wires 26. The arrangement of the wire 26 in actual construction is shown in Figure 1 of the drawings. For heavy current capacity, this connection is extended out of the motor casing, as shown in Figure 2 of the drawings, to a contact 27, engaging the end of the motor shaft and the shaft is provided with a wire 28, arranged in a recess 29 and connected to the inner bushing of the ball bearing race way. The opposite ends of the feed wires are provided with lead wires 30, extending to the load in the usual manner.

In operation, the disk is maintained at an angle by the bearing so that contact occurs between one point on the periphery of the disk and the metallic ring formed by the members 12. By revolving the disk with the shaft, the point of contact is continually changed. As shown, a disk and ring are arranged at each end of the motor casing and when the point of contact is at the top at one end of the casing, it is at the bottom at the opposite end of the casing. The relative position of the contact in the motor casing remains the same but the point of contact between the disk and the ring is continually changed, as the shaft revolves.

It is to be understood that the forms of the invention herewith shown and described are to be taken as preferred examples of the same, and that various changes in the shape, size, and arrangement of parts may be resorted to without departing from the spirit of the invention or the scope of the subjoined claims.

I claim:

1. In a device of the character described, a casing, a shaft mounted in said casing, a stationary element mounted in the casing, a revolving element mounted in said casing, a ring carried by said revolving element adjacent each end of the casing, and a disk carried by said shaft and arranged at an angle transversely of the shaft to engage said ring at one point in its circumference.

2. In a device of the character described, a casing, a shaft mounted in said casing, a stationary element mounted in the casing, a revolving element mounted in said casing, a ring carried by said revolving element adjacent each end of the casing, and laminated disks of conducting material carried by said shaft, said disks being arranged at an angle to a plane extending transversely of said shaft whereby each of said disks will engage one of said rings at one point in its periphery.

3. In a device of the character described, a casing, a shaft mounted in the casing, a stationary element mounted in the casing, a revolving element carried by said shaft, a ball race carried by said shaft and arranged at an angle to a plane extending transversely of said shaft, a disk connected to one member of said ball race, and a metallic ring carried by said revolving element and adapted to be engaged by said disk at one point in its periphery.

4. In a device of the character described, a casing, a shaft mounted in the casing, a stationary element mounted in the casing, a revolving element carried by said shaft, a metallic element carried by said revolving element and adapted to form a substantially continuous ring, a bearing comprising a bushing carried by said shaft and a bushing carried by said casing, said bushings being provided with ball races arranged at an angle to a plane extending transversely of the shaft, ball bearings arranged therein, and a disk carried by one of said bushings and adapted to engage said ring at one point in its periphery.

5. In a device of the character described, a casing, a shaft mounted in the casing, a stationary element mounted in the casing, a revolving element carried by said shaft, a metallic ring carried by said revolving element, a bearing cage comprising a member carried by said shaft, and a member carried by said casing, said members being provided with a ball race arranged at an angle to a plane extending transversely of the shaft, bearings arranged in said ball race, a disk carried by one of said members and engaging said ring at one point in its periphery, and an insulated bushing arranged between said first bearing member and said shaft.

6. A device constructed in accordance with claim 1 wherein said ring comprises a plurality of metallic bars secured to said revolving element and insulated therefrom, the ends of said bars being arranged at right angles to the body portion to form said ring.

7. A device constructed in accordance with claim 1, wherein said ring comprises a plurality of metallic bars secured to said revolving element and insulated therefrom, the ends of said bars being arranged at right angles to the body portion to form said ring and being supported by a ring of insulating material carried by said shaft.

In testimony whereof, I affix my signature in presence of two witnesses.

CLYDE W. LANDERS.

Witnesses:
  J. A. NOLAND,
  CHARLES E. MIVELAZ.